June 12, 1951   K. M. LORD ET AL   2,556,363
ALARM SYSTEM WITH CIRCUIT INTEGRITY CHECKING MEANS
Filed Sept. 23, 1948   2 Sheets-Sheet 2
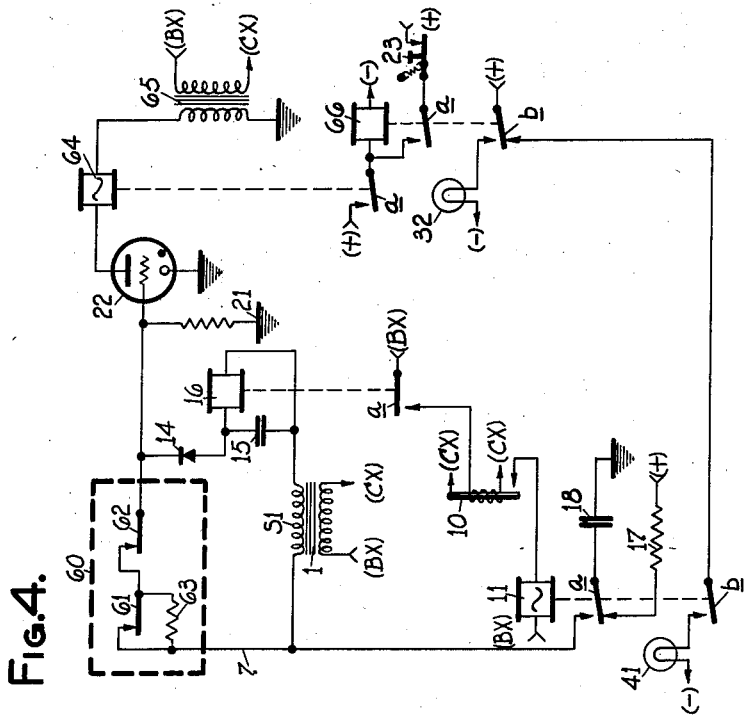
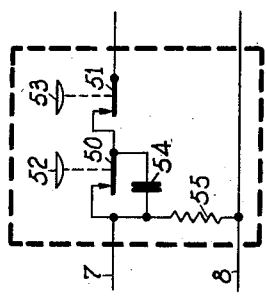
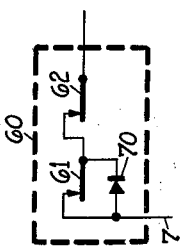
INVENTORS
K.M. LORD AND P.N. BREDESEN
BY
Forest B. Hitchcock
THEIR ATTORNEY Patented June 12, 1951

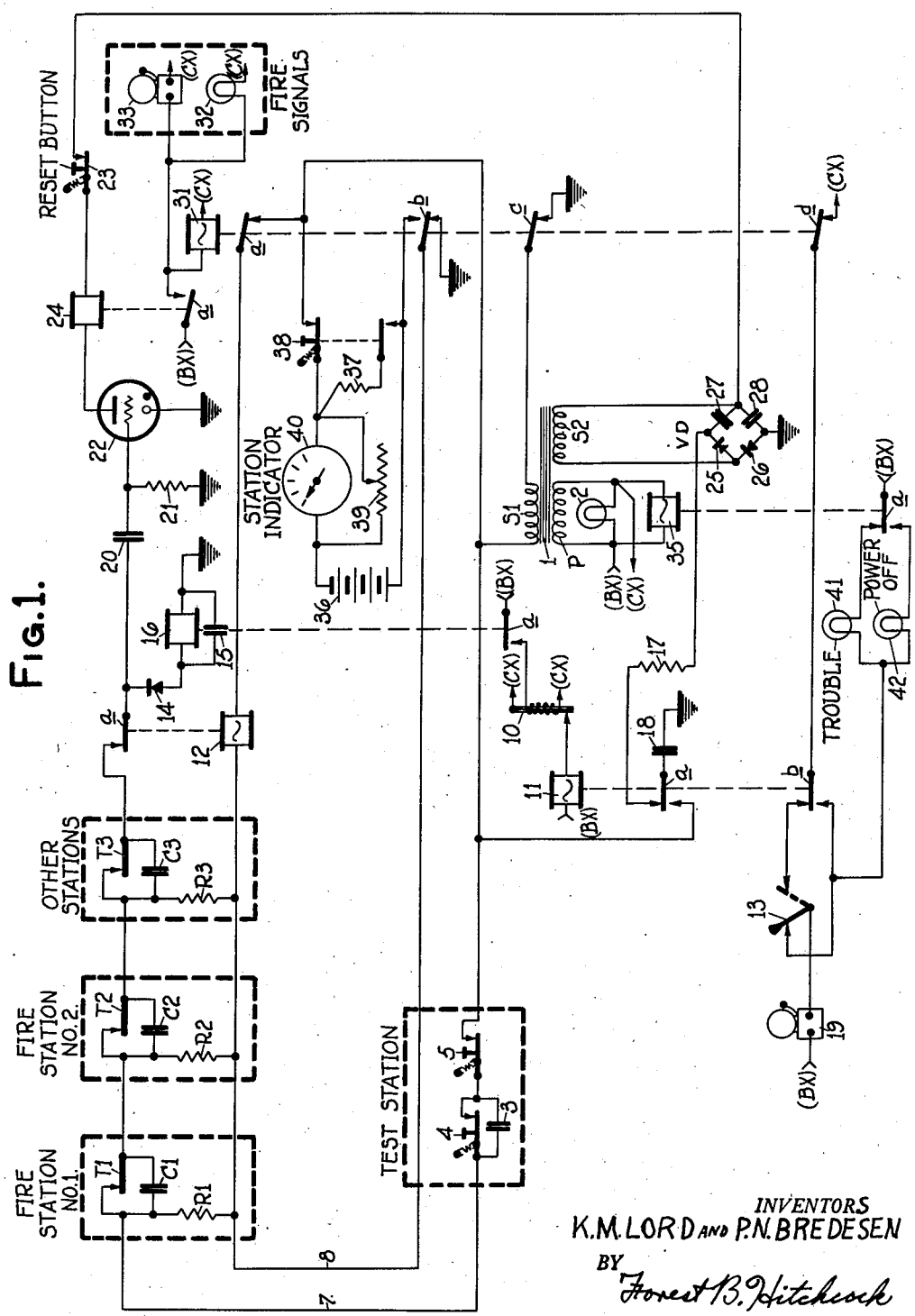

2,556,363

UNITED STATES PATENT OFFICE 2,556,363

ALARM SYSTEM WITH CIRCUIT INTEGRITY CHECKING MEANS

Kenneth M. Lord and Philip N. Bredesen, Canandaigua, N. Y., assignors to Lord Taber Company, Canandaigua, N. Y.

Application September 23, 1948, Serial No. 50,744

12 Claims. (Cl. 177—311)

The present invention relates to remote indicating systems, and more particularly pertains to a circuit organization for indicating at a central station the occurrence of different conditions at any one of a plurality of distant locations.

An indicating system of the type contemplated in accordance with the present invention may be used in an alarm system, such as in the case of fire alarms in factories, warehouses and the like, or may be used in connection with the control of pressures in the pressure cookers of canning factories, and the like.

When such an indicating system is used for detecting temperatures and giving an alarm in a fire alarm system, it is desirable to so organize the system that a trouble indicator will be activated rather than giving an actual alarm, if a line wire becomes opened due to a line break instead of the actual operation of a temperature detecting means. Likewise, a short or a ground on a line wire in such a manner as to prevent proper operation of the system should cause a trouble indication rather than a regular alarm. These are requirements of the underwriters in view of the fact that it is highly undesirable to give a false fire alarm.

If the indicating or alarm system is employed in an industrial plant of substantial size, it will be apparent that a large number of temperature indicating devices will be employed at spaced intervals throughout the plant. With such an organization, it is desirable to employ means for locating the particular station that is effective upon the giving of an alarm.

Generally speaking, and without attempting to define the exact nature and scope of the invention, it is purposed in view of the above considerations to provide an indicating system which is operated over two line wires, which line wires have associated therewith suitable means for detecting their integrity. In one of the line wires is located the detecting contacts, which are actuated in response to a change in the ambient conditions, such as a change in temperature, pressure, liquid level, or the like; and the operation of such a detecting contact causes the associated indicating means to set into operation the alarm condition detector to determine whether or not such interruption of the line circuit is due to a line failure or an actual operation of a detecting contact.

More specifically, the alarm condition detector is purposed to be in the form of an impulse transmitter and an electronic receiver, so organized that the impulse receiver will be operated only if there is an actuation of a detecting contact.

A further characteristic feature of the present invention resides in the provision of means for automatically rendering a station indicator or locator effective upon the occurrence of an actual alarm condition.

In order to accomplish these various desirable functions over a single pair of line wires, it is necessary to so correlate the different devices as to effect their operations in particular sequences and to provide circuit connections and conditions for control which mutually contribute toward the desired ends. These various interrelationships will be better understood as the detail structure and operation of the system is later described.

In order to illustrate the complete organization proposed in accordance with the present invention and to show the various relationships, certain features and functions disclosed in the prior application of Lord and Warren, Serial No. 579,740, filed February 26, 1945, now Pat. No. 2,452,942 dated November 2, 1948, have been disclosed herein; but it is to be understood that no claim is intended to be made herein to any subject matter common with such prior application.

Other objects, purposes, and characteristic features of the present invention will be in part obvious from the accompanying drawings and in part pointed out as the description of the invention progresses.

In describing the invention in detail, references will be made to the accompanying drawings, in which like reference characters designate corresponding parts throughout the several views and in which:

Fig. 1 is a diagrammatical illustration of an indicating system embodying the principles of the present invention and adapted for use as a fire alarm system;

Fig. 2 is a modified form of detector station to indicate two different conditions at the same detector station;

Fig. 3 represents diagrammatically how several detector stations are associated together, the operation of any one of which causes the station locator to give the same indication;

Fig. 4 is a modified form of the indicating system embodying the present invention and illustrates diagrammatically how different devices may be employed to accomplish the functions of the alarm condition detector; and Fig. 5 is a modified form of detector station that may be used in connection with the system organization illustrated in Fig. 4.

For the purpose of simplifying the illustration and facilitating in the explanation, the various parts and circuits constituting the embodiment of the invention have been shown diagrammatically and certain conventional illustrations have been employed, the drawings having been made more with the purpose in mind of making it easy to understand the purposes and mode of operation of the invention, than with the idea of illustrating the specific structure and arrangement of parts that would be employed in practice. Thus, the various relays and their contacts are illustrated in a conventional manner, and symbols are used to indicate connections to the terminals of batteries or other source of electrical energy instead of showing all of the wire connections to these terminals.

The symbols (+) and (−) are employed to indicate the positive and negative terminals respectively of suitable batteries, or other sources of direct current; and the circuits with which these symbols are used, always have current flowing in the same direction. The symbols (BX) and (CX) are used to indicate connections to the opposite terminals of a suitable source of alternating current, such for example the usual commercial sixty cycle alternating power supply, although it should be understood in this connection, that any suitable frequency and voltage of alternating current may be employed, the symbols (BX) and (CX) being used more particularly for the purpose of distinguishing between the different terminals.

Before considering the various functions and operations of the system as a whole, the structural characteristics of the various devices and certain of their circuit connections will be pointed out. More especially with reference to Fig. 1 of the drawings, a main transformer 1 is illustrated as having primary winding P connected to the opposite terminals of a suitable source of alternating current, as indicated by the symbols (BX) and (CX). An indicator lamp 2 is connected across the terminals of this primary winding P and the source so as to give a distinctive visual indication, such as green, when the power is present. Also, a suitable power off relay 35 of the alternating current type adapted to operate on the voltage and frequency of the power supply is connected across these same terminals. This transformer 1 is provided with a secondary winding S1 which is connected to operate the relays 12 and 16 employed for indicating the continuity of the line circuits, as will be later described.

For the sake of definiteness in the present disclosure, when the usual commercial source of alternating current is employed, the primary winding P is constructed to operate at one hundred eighteen volts, in which case the secondary winding S1 is constructed to give a reduction in the voltage to a value such as thirty volts. Another secondary winding S2 is employed which is adapted to give an increased voltage such as one hundred fifty volts. These voltages have been given in the usual root mean square terms, but since this high voltage secondary winding S2 is connected to a voltage doubler VD including the rectifier units 25 and 26 as well as the condensers 27 and 28, the voltages produced by this voltage doubler are of course dependent upon peak values of the alternating current voltages. For example, the voltage doubler VD may provide direct current voltages, such as four hundred volts. The rectifier units 25 and 26 may be of any suitable type, such as a dry plate rectifier of the copper oxide or selenium types.

The apparatus at the central office is connected with the outlying stations by two line wires 7 and 8 which extend to the several detector stations and return to the central station. As illustrated in Fig. 1, the outlying detector stations are assumed to be fire detecting stations, and include contacts operated by suitable thermostats, such as T1, T2, T3, etc. These contacts may be operated by suitable bi-metallic elements or other temperature responsive means. Each detecting contact, such as contact T1 at the fire station No. 1 is shunted by a condenser, such as a condenser C1. All of the detecting contacts T1, T2, T3, etc. are included in the line wire 7 which may for convenience be termed the detecting line wire. Each detector station includes a connection between the detecting line wire 7 and the locator line wire 8 through a resistor, such as resistor R1, at fire station No. 1. These resistors for the various detector stations all have the same value of resistance. In this connection, any suitable number of detector stations may be provided, one embodiment having been designed to have thirty-three such stations.

For the purpose of testing the equipment periodically, a "Test station" is provided with the similar apparatus as employed at a "Fire station" but its contact is operated by a manually operated push button 4 which is shunted by the condenser 3. Also, included at this test station is another manually actuatable push button 5 which is included in the detecting line wire 7 without a shunting condenser for the purpose of testing the trouble signal, as will be later described.

The detector line wire 7 is connected to one terminal of the secondary winding S1 of the transformer 1, while the other terminal of this winding is connected to ground through a back contact c of relay 31.

The locator line wire 8 includes at its output end a relay 12 of the alternating current type adapted to operate on the relatively low voltage of the secondary winding S1 of the transformer 1 by reason of a circuit which extends from the left hand terminal of such secondary winding S1 through a circuit including back contact a of relay 31, relay 12, locator wire 8, back contact b of relay 31, to ground. Thus, the relay 31 is normally energized.

A low voltage direct current relay 16 is connected to the detector line through a rectifier 14 which may be of any suitable type, such as a copper oxide or selenium dry plate rectifier. The relay 16 is shunted by a condenser 15, and has one terminal connected to the ground. Thus, this relay 16 is normally energized through front contact a of relay 12, all of the detecting contacts, such as contacts T1, T2, T3, etc. and the test buttons 4 and 5 to the left hand terminal of the secondary winding S1 of the transformer 1. This circuit provides relay 16 with half cycles of alternating current which are smoothed by the shunting condenser 15 to give substantially direct current energization of this relay 16. The voltage supplied by the secondary winding S1 of the transformer 1 is of such a low value that it does not actuate the grid glow or cold cathode tube 22. This tube 22 has its grid connected to the detector wire 7 through a condenser 20 and is connected to ground through a relatively high grid leak resistor 21.

The plate of the tube 22 is included in a circuit extending from a mid point of the voltage doubler VD through a re-set button 23 and a direct current relay 24. The direct current voltage supplied from this mid point connection to the voltage doubler VD is substantially two hundred volts, but since the capacity of this voltage doubler may be relatively low because its operation is intermittent, the direct current voltage supplied by it may drop somewhat when the tube 22 is rendered conductive.

The relay 24 is provided with a repeater relay 31 of the alternating current type, which is controlled through front contact *a* of relay 24. This same front contact *a* of relay 24 also closes a circuit to the fire signal including a suitable red indicating lamp 32 and a gong 33.

The relay 16 has a back contact *a* which closes a circuit, when the relay is de-energized, through the winding of a thermal relay 10. This thermal relay 10 is normally cold and its contact is in a position to normally complete a circuit for an alternating current relay 11, but when the thermal relay 10 has been energized for a suitable period, such as five seconds, the thermal relay 10 opens its contact and de-energizes the relay 11.

When the relay 11 is energized, it connects the condenser 18 through its front contact *a* and resistor 17 to the high point of the voltage doubler VD. This voltage doubler VD provides a relatively high direct current voltage, such as four hundred volts for example, so that the condenser 18 is charged after a period of time determined by its size and the value of resistor 17. This resistor 17 is suitably selected so that the full charge of the condenser 18 does not have to flow through the contact *a* of relay 11 immediately upon its closure, thus protecting the contact *a* of relay 11 from a heavy current.

Associated with the relays 11, 12, 35, and 31 are lamps 41 and 42. These lamps are of amber color. The lamp 41 indicates, when illuminated, trouble in the system; whereas, the lamp 42, when illuminated, indicates a power off condition with respect to the primary winding P of the main transformer 1. In this connection, it is obvious that these various auxiliary devices may be operated from a different source, such as, a different phase of the alternating current supply, or from some suitable stand-by direct current source, or the like. This is especially desirable in the case of a power off lamp 42 where controlled from the same source as supplying the primary winding P of the transformer 1.

A gong 19 is connected through a manually operatable switch 13 to the left hand terminals of the lamps 41 and 42, so that it gives an audible indication at the same time that the lamps give a visual indication. However, there are occasions, when the power off or trouble conditions cannot be remedied immediately so that it is desirable to silence the gong 19 by operation of the manually operatable switch 13 to its right hand position. In this operated position of the switch 13, the circuits provide that the gong again sounds when the trouble has been remedied and the power has been restored. Upon such sounding of the gong the attendant restores the switch 13 to its normal position illustrated in which it is in readiness to again sound when trouble or power off conditions take place.

The central office equipment also includes a station indicator or locator 40 which, upon the operation of the relay 31, is connected in series with battery 36 across the locator line 8 and the detector line 7. This station indicator 40 is essentially an ammeter which is calibrated to indicate different positions in accordance with the current which flows as determined by the number of resistors R1, R2, R3, etc. remaining in parallel when the detecting contact of a particular detector station is operated. In order that this station indicator may be properly calibrated for the existing conditions, a suitable test push button 38 is provided which disconnects the ammeter from the line wires 7 and 8, and connects it across a standard resistor 37 which represents an intermediate point of the indicator scale corresponding to one of the detecting stations. If the indicator fails to give this reading upon the actuation of push button 38, then the variable resistor 39 is adjusted until the standard reading is given.

It is believed that a further understanding of the present invention will be best obtained by considering the various features and functions from the standpoint of typical operations of the system.

*Operation*

Under normal conditions, the system is supplied with electrical energy as specifically indicated in Fig. 1, it being understood that suitable power switches, fuse connections, and the like, would be provided in practice so that the power could be removed for maintenance of the system. Thus, the relay 12 is normally energized over the locator line wire 8 from the secondary winding S1 of the transformer 1. Also, the relay 16 is normally energized over the detector line wire 7 from the secondary winding S1 of the transformer 1. As above described, the relay 11 is normally energized by reason of the contact of the thermal relay 10 being in a normally cold position. This means that a relatively high voltage is supplied from the voltage doubler VD to the condenser 18 which is assumed to be fully charged under normal conditions. Since the power is normally applied, the indicator lamp 2 is normally illuminated, and the relay 35 is normally picked up.

Let us assume that the temperature condition adjacent the fire station No. 2 rises above a predetermined safe value, indicative of an abnormal condition such as produced by a fire, this causes the contact T2 to be opened which interrupts the energizing circuit of the relay 16. Upon the closure of back contact *a* of this relay 16, the winding of the thermal relay 10 is supplied with energy so that after the elapse of a suitable time, such as five seconds, the contact of the thermal relay opens and de-energizes the relay 11. The closure of back contact *a* of relay 11 connects the positively charged terminal of the condenser 18 to the detector line 7 so that it discharges through the various other contacts, such as contacts T1, and T3, while passing through the condenser C2 at the station No. 2 at which the changed temperature condition has opened the contact T2. This pulse of energy also passes through the condenser 20 and the resistor 21 to ground. The potential drop across the resistor 21 causes the grid of the tube 22 to be raised to such a positive value that the tube becomes conductive. Upon the rendering conductive of the tube 22, a current flow is established from the mid point of the voltage doubler through the reset button 23, relay 24, anode of tube 22, cathode of tube 22 to ground. This current flow, when once established by the impulse applied from the condenser 18, continues and causes the relay 24 to pick up. This characteristic of a grid glow tube is well understood in the art, i. e., once the grid has rendered the tube conductive, the tube continues to conduct regardless of the grid potential until the anode potential is reduced to substantially zero.

As soon as the relay 24 picks up and closes its front contact a, it energizes the red warning lamp 32 and the gong 33. At the same time, the relay 31 is energized which opens back contacts a and b to disconnect the check relay 12 from the high terminal of the transformer secondary S1 and closes the front contact b to connect the station indicator 40 to the locator line wire 8. The de-energization of relay 12 opens its front contact a so that relay 16 is positively maintained disconnected from the line 7 it remains de-energized regardless of a possible subsequent closure of the contact T2 at the fire station No. 2. Also, the opening of back contact C of this relay 31 disconnects the transformer from ground so that the line wire 7 is isolated for use by the station locator 40. The closure of back contact a of relay 16 does not cause the trouble lamp 41 or gong 19 to be energized because the back contact d of relay 31 is opened prior to the closure of such back contact a of relay 16.

Upon the coupling of the station indicator 40 to the locator line wire 8, the battery 36 causes the indicator to move its pointer to its position No. 2 corresponding to the fire station No. 2. In this connection, it will be noted that the first position represents the fire station No. 1; the second position represents the fire station No. 2; and so on. Since the station indictor 40 is thus calibrated with the proper station numbers, the attendant can readily observe the actual location of the fire condition.

Upon such recognition of the location of the fire, or at any suitable time thereafter, the attendant may actuate the re-set button 23 and initiate the restoration of the system to its normal condition. As above mentioned, the opening of the contact of the re-set button 23 removes all potentials from the anode of tube 22 so that it ceases conduction, since the charge of the condenser 18 has leaked off through the resistor 21. This de-energizes relay 24 which in turn de-energizes relay 31 and the fire signal. Relay 31 in becoming de-energized disconnects the station indicator and re-energizes the relay 12. If the detecting contact, such as contact T2, has been restored to normal, then the relay 16 is also re-energized. This causes the thermal relay 10 to be restored so that relay 11 may be picked up to again effect the charging of the condenser 18, and cause the trouble signal to cease operation. On the other hand, if the detecting contact, such as contact T2 has not yet restored to its normally closed position, the relay 16 remains de-energized to cause the trouble signal to continue until such detecting contact is restored even though the fire signal has ceased its operation due to the de-energization of relay 24. In other words, the attendant can actuate re-set button 23 to cause the fire alarm to cease at any time he so desires, but the trouble signal continues until the detector station restores to normal. In this manner, the system is restored to normal in readiness for detecting a subsequent abnormal condition at one of its detector stations, or an abnormal circuit condition as presently to be described.

In the above operation, it is noted that the charge of the condenser 18 does not pass through the relay 16 to ground by reason of the high inverse resistance of the rectifier unit 14. Also, this charge cannot pass to ground through the secondary winding S1 of the transformer 1 because of its relatively high inductive characteristics. In other words, the actual fire condition is detected by reason of an impulse which checks the continuity of the detector line subsequent to the opening of the contact T2 which has not affected the transmission of the pulse. Obviously, if the detector line wire were open at some other point (other than at a detecting contact), the pulse would not reach the grid of the tube 22.

If the relay 16 is de-energized due to a break in the line wire 7, such break would obviously not be shunted by a by-passing condenser. Thus, the tube 22 would not be fired and the relay 31 would not be picked up at the time the relay 11 closes its back contact a. For this reason, only the trouble lamp 41 would be illuminated and the gong 19 activated under such conditions.

Whenever the trouble gong 19 is activated, the attendant may operate the switch 13 to its right hand position so as to cause the sounding of the gong 19 to cease, if he so desires. When the trouble or fire condition has been remedied and the relay 11 again picked up, the front contact b of relay 11 then energizes the gong through the switch 13 in its right hand position. The attendant then restores the switch 13 to its left hand position in which it is in a condition to render the gong 19 subject to the occurrence of further trouble.

A similar situation takes place if a break occurs in the locator line wire 8 to cause the de-energization of the relay 12. This opens front contact a of relay 12 which in turn de-energizes relay 16. This causes thermal relay 10 to operate and relay 11 to be de-energized and cause the sounding of the trouble gong 19 and the illumination of the trouble lamp. But it will be apparent that the opening of front contact a of relay 12 prevents the application of an impulse from condenser 18 to the tube 22. For this reason, the fire alarm is not given when only a trouble condition exists. In this connection, it should be noted that a short between wires 7 and 8, or the grounding of either wire merely causes the operation of relays 12 and 16 in such a way as to give only a trouble signal without giving a fire alarm.

The resistor 21 is of a suitable value to provide for the discharge circuit of the impulse for condenser 18 and acts to stabilize the control of the grid of tube 22 against transient static impulses on the wire 7. It should be also noted that the thermal relay 10 is provided to give a delay time after the release of the relay 16 so that a temporary circuit interruption or momentary power failure in the detecting circuit does not immediately cause the giving of a fire alarm. This thermal relay time has the added advantage that if the indicator contacts, such as contacts T1, T2, T3, etc., should open very slightly and cause an intermittent breaking of the detector circuit, and the relay 16 should follow these interruptions, such intermittent control would not be transmitted to the relay 11. Thus, the condenser 18 would have its full charge in readiness for an actual operation upon the permanent operation of a detecting contact.

Attention is also directed to the fact that the relatively low voltage supplied to the relay 16 is of an insufficient value to operate the tube 22.

For example, the secondary winding S2 might supply approximately thirty volts while the tube 22 might have such characteristics as to require seventy volts to fire it. Obviously, this provides a substantial margin of difference between the two voltages.

As above mentioned, the present invention may be employed for other purposes than detecting fire conditions. For example, the detecting contacts might be activated in response to pressure changes, liquid levels, or the like. This has been illustrated in Fig. 2 where a detector station is illustrated as having a contact 50 actuated in response to one pressure condition and another contact 51 actuated in response to a different pressure condition, by reason of the pressure responsive Sylphons 52 and 53 respectively associated with these contacts. Contact 50 is shown as having condenser 54 shunting it. Also, resistor 55 connects detector wire 7 with locator wire 8. The condenser 54 corresponds to the condenser C of Fig. 1; and resistor 55 corresponds to the resistors R of Fig. 1.

Assuming that each of the detector stations of Fig. 1 are replaced by detector stations such as shown in Fig. 2, then the opening of the contact 50 of such a station would cause one indicator such as indicator 32 to be illuminated; whereas the opening of the other contact 51 of such a station would cause only the illumination of the detector 41. In this way, two different pressures, temperatures, or the like may be indicated as occurring at a particular detector station.

In some cases, there will be several indicator stations within the same area, and it will only be necessary for the station indicator 40 to display the particular area in which the change in ambient conditions has taken place. In such a case, the detector stations are arranged as illustrated in Fig. 3, where station No. 1 of Fig. 1 has been illustrated as having a plurality of substations associated therewith, such as the substation No. 1A and sub-station No. 1B. Obviously, any number of sub-stations may be employed with any one or more of the detector stations used in Fig. 1.

With reference to Fig. 4, a modified form of the present invention has been shown in so far as the detecting of a change in ambient conditions is concerned. This form of the invention is intended to illustrate the application of the detecting principles without showing the station locator associated therewith. More specifically, the typical detector station 60 is shown as having two detecting contacts 61 and 62 with the contact 61 shunted by resistor 63 rather than by a condenser, as shown in Fig. 1. Also, the tube 22 is shown as having its grid connected directly to the detector line circuit 7 rather than through the condenser 20 of Fig. 1. The tube 22 also receives its plate energy through an alternating current relay 64 from the secondary winding of a suitable transformer 65.

The relay 11 is normally de-energized in this form of the invention because the thermal relay 10 is provided with a hot contact instead of a cold contact as in Fig. 1. The condenser 18 is charged through the resistor 17 from a suitable direct current source as indicated by the symbols. Upon the opening of a detector contact at the typical station, the relay 16 is de-energized. This happens regardless of whether it is contact 61 or 62 because the shunting resistor 63 across contact 61 is of such a relatively high value that insufficient current can flow through the relay 16 to maintain it energized. The closure of its back contact $a$ energizes the winding of the thermal relay 10 the same as described in connection with Fig. 1. After a time, as required for its operation it closes its operated contact (or hot contact) to energize the relay 11. Upon the picking up of this relay 11, the condenser 18 is connected to the detector circuit through front contact $a$ of this relay 11 to dissipate its charge through the resistor 21 if the contact 61 is the one that opened. The rate of its discharge resistor 21 and the resistor 63 shunting the detector contact 61 is of such a time duration that the positive drop across the resistor 21 causes the grid of the tube 22 to render it conductive for a substantial period of time.

This discharge time of the condenser 18 is sufficient to effect the energization of the alternating current relay 64 and cause it to close its front contact $a$ to energize its repeater relay 66 which immediately closes its front contact $a$ to establish a stick circuit through the re-set button 23. The closure of front contact $b$ of this repeater relay 66 effects the energization of the indicator lamp 32 which remains illuminated until the re-set button 23 is actuated to release the repeater relay 66. However, as soon as the charge of the condenser 18 has dissipated to a point where the control grid of the tube 22 fails to be sufficiently positive to render the tube conductive the tube ceases conduction because its anode is made negative during each negative half cycle of the alternating current. When the detector contact at the detector station has been restored due to the restoration of its control condition, then the relay 16 is re-energized and the thermal relay 10 is restored de-energizing the relay 11. This allows the recharging of the condenser 18 in readiness to detect another abnormal condition.

If on the other hand, the contact 62 opens at the typical detector station, the relay 16 is de-energized without affecting the energization of the relay 66 so that its back contact $b$ is not open while the relay 11 is picked up. This causes the other indicator lamp 41 to be energized. In this way, the occurrence of either of two conditions may be indicated. Obviously, any number of detector stations may be employed.

Fig. 5 shows the detector station 60 of Fig. 4 as having its contact 61 shunted by a rectifier unit 70 instead of the resistor 63. This rectifier unit 70 is so connected as to permit the discharge of the condenser 18, but does not permit current flow throgh it for energizing relay 16 when contact 61 is open due to ambient conditions.

Having described several forms of an indicating system embodying the principles of our invention, it is to be understood that various other alterations and modifications may be made to meet the various conditions of practice without in any way departing from the contemplated scope of the invention.

What we claim as our invention is:

1. In an indicating system, a plurality of detector stations each having a normally closed contact capable of being opened upon a change in ambient conditions, a relatively high impedance shunting each of said contacts, a normally closed circuit including said contacts in series with a source of energy and a detecting relay, said circuit being effectively deenergized to allow the drop away of said relay upon the opening of any one of said contacts irrespective of any current that may flow through said relatively high impedance shunting said contact open at that time, a normally open circuit including said contacts in series and connected to a grid glow tube, circuit means controlled by said relay when dropped away for placing an impulse of relatively high potential on said normally open circuit to thereby cause sufficient current to flow through the relatively high impedence associated with said contact then open to effect the firing of said grid glow tube when any one of said contacts is opened but not if said normally closed circuit is opened because of broken line wire, and alarm indicating means controlled by the firing of said grid glow tube.

2. In an indicating system, a plurality of detector stations located at a distance from a central office, a normally closed detecting contact at each station operable to open upon the occurrence of a predetermined ambient condition, a loop line circuit extending from said central office through all said detector stations to include said detecting contacts of the several stations in series, a condenser at each station for shunting said detecting contact at that station, whereby the opening of any one of said detecting contacts acts to open said line circuit with respect to electric current of one characteristic but not another characteristic, circuit means at said central office including a source of energy for normally applying current of said one characteristic to said loop line circuit, a relay included in series in said loop line circuit being responsive to current of said one characteristic but not the other to check whether said circuit is complete with respect to said detecting contacts at said detector stations, other circuit means controlled by said relay for applying current of said relay for applying current of said other characteristic upon the cessation of the energization of said relay by current of said one characteristic, electro-responsive means at the central office rendered active only in response to current of said another characteristic received over said line circuit, and indicating means at the central station effective to give a distinctive indication when said electro-responsive means is rendered active.

3. In an indicating system, a series of normally closed contacts each being operable to open positions individually upon a change in its ambient condition, a condenser shunting each of said contacts, a circuit including said contacts in series and energized only when all of said contacts are closed, said circuit also including a relay and a source of energy, a separate circuit including said contacts in series and governed by said relay so as to be momentarily energized only when said first circuit becomes deenergized and only providing such separate circuit is complete in all respects except the open condition of one or more of said contacts, and indicating means distinctively responsive to the energized condition of said separate circuit.

4. In an indicating system, a central alarming station and a plurality of detecting stations connected in series through a relay and across a first source of power to establish a normally energized detector circuit, each detector station including a normally closed contact connected in said detector circuit and adapted to open and deenergize said detector circuit upon the occurrence of a predetermined local condition, a normally open indicating circuit including an ammeter and a second source of power at said central alarming station, said indicating circuit at one end including a line wire extending to said detector stations and permanently connected to said detector circuit at each station through a fixed resistor and said indicating circuit at its other end having connection to that portion of said detector circuit including said contacts in series, a trouble signal set into operation upon the deenergization of said relay, a condenser connected across said contacts at each detecting station, a checking circuit including said contacts at said detecting station in series and having an electronic detector at said central station, impulse transmitting means at said central station rendered effective upon the release of said relay to apply a pulse of energy to said checking circuit, and an alarm circuit closed upon the reception of a pulse by said electronic detector, whereby the opening of the contacts at one of said detecting stations effects the closure of said alarm circuit while the accidental opening of said detecting circuit connecting said detecting stations only causes the release of said relay and the actuation of said trouble signal.

5. In an indicating system, a central station including a station indicating ammeter, a plurality of detecting stations each including a normally closed contact operable to an open position upon the occurrence of a predetermined condition, a detector relay at the central station, a normally energized detector circuit including said contacts at said detecting stations in series and said relay at said central station, a locator line wire extending from said central station through said detector stations and return, a fixed resistor connected between said detector circuit at each of said detecting stations, a continuity detecting relay and a source of energy at said central station connected in series with said locator line wire to constitute a normally energized circuit, a contact of said continuity detecting relay included in series in said detector circuit, a trouble indicator controlled by said detector relay when it is deenergized, electric circuit means set into operation upon the deenergization of said detector relay for checking whether said detector circuit has been erroneously opened or opened due to the opening of one of said contacts at one of said detector stations, and means effective upon the occurrence of this last named condition to open said detector circuit and said circuit including said continuity detecting relay and connecting said station indicating ammeter and a source of energy between said locator line wire and said detector circuit.

6. In an indicating system, a plurality of detector stations located at spaced points apart from a central office, a line wire extending from said central office through said detector stations in series and return, a detecting contact and current discriminating means included in multiple in said line wire at each such station operative upon the occurrence of a predetermined condition to open the line wire with respect to electric current of one characteristic but not to electric current of another characteristic, circuit means at the central office including a relay and a source of energy for normally applying current of said one characteristic to said line wire to constitute a detector circuit which is opened upon the opening of any one or more of said detecting contacts, a time measuring device set into operation upon the deenergization of said relay, other circuit means including a source of energy and controlled by said time measuring device after elapse of a predetermined time for applying electric current of said another characteristic to said line wire, and means at the central station responsive only to current of said another characteristic for giving a distinctive indication, whereby the continuity of said line wire is checked upon each deenergization of said relay before said distinctive indication is given.

7. In an alarm and station locating system, a series of normally closed contacts located at separated stations and acting to open upon the occurrence of a particular condition, a detector circuit means including a source of electric current and a relay for determining when all of said contacts are closed and when any one of them is open, check circuit means set into operation upon the deenergization of said relay for checking the open condition of one of said contacts and being ineffective to give a distinctive control upon the mere interruption of said detector circuit by other than an open contact, a station locating ammeter, and locator circuit means governed by the distinctive control of said check circuit means for opening said detector and check circuits and connecting said locating ammeter and a source of energy in multiple with said contacts through fixed resistors at said station.

8. A combination according to claim 5 in which the trouble indicator is a gong, a manually operable switch, and circuit means governed by said switch for manually deenergizing said gong upon the occurrence of a trouble condition in such a manner as to cause the going to again be energized upon the removal of the trouble condition until said switch is restored to its normal condition.

9. In an alarm system, a contact operated to different positions for different predetermined conditions adjacent said contact, a condenser shunting said contact, a direct current circuit including a detecting relay in series with said contact for detecting when said contact is open, another circuit through said contact including the grid of a trigger type tube, means including a condenser governed by said detecting relay for placing an impulse of current on said another circuit when said contact is opened, a plate circuit for said tube including a signal relay, a source of direct current and a normally closed reset button, and an alarm signal set into operation upon the operation of said signal relay.

10. In an alarm system, a contact operated to different positions for different predetermined conditions adjacent said contact, a relatively high resistor shunting said contact, a detector circuit including a detecting relay in series with said contact and a relatively low potential source of energy for detecting when said contact is open, another circuit through said contact including the grid of a trigger type tube, circuit means including a condenser governed by said detecting relay for impressing a relatively high potential pulse on said another circuit when said contact is opened to thereby effect the firing of said tube through said resistor, a plate circuit for said tube including a signal relay, and an alarm signal rendered active when said signal relay is operated.

11. In an alarm system, a normally closed contact operated to an open position upon the occurrence of a predetermined condition, a relatively high impedance connected to shunt said contact, a detector circuit including a detecting relay in series with said contact and a relatively low potential source of energy for detecting when said contact is open, a tube having an anode, a cathode and a control grid, a circuit for said control grid governed by said detecting relay for impressing a relatively high potential on said grid through said impedance when said contact is opened, an anode-cathode circuit for said tube including a signal relay and a source of energy, and an alarm signal controlled by said signal relay.

12. In an alarm system, a normally closed contact operated to an open position upon the occurrence of a predetermined condition, a rectifier unit connected across said contact and with a particular polar connection, a detector circuit including a detecting relay, a source of energy and a rectifier with a polar connection opposite to said particular polar connection to thereby effect the deenergization of said detecting relay when said contact is opened, a tube having an anode, a cathode and a control grid, a circuit for said control grid governed by said detecting relay for impressing a relatively high potential on said grid with a polarity to flow through said rectifier across said contact in said particular direction in spite of the open condition of said contact to thereby render said tube conductive when said contact is opened, an anode-cathode circuit for said tube including a signal relay and a source of energy, and a signalling circuit controlled by said signalling relay.

KENNETH M. LORD.
PHILIP N. BREDESEN.

REFERENCES CITED

The following references are of record in the file of this patent:

UNITED STATES PATENTS

| Number | Name | Date |
| --- | --- | --- |
| 1,772,671 | Lomax | Aug. 12, 1930 |
| 1,909,212 | Muehter | May 16, 1933 |
| 2,052,057 | Reid | Aug. 25, 1936 |
| 2,220,371 | Hopkins | Nov. 5, 1940 |
| 2,223,103 | Hailes | Nov. 26, 1940 |
| 2,355,934 | Weld | Aug. 15, 1944 |
| 2,452,942 | Lord et al. | Nov. 2, 1948 |

FOREIGN PATENTS

| Number | Country | Date |
| --- | --- | --- |
| 534,300 | Great Britain | Mar. 4, 1941 |